(12) United States Patent
Kursun (10) Patent No.: US 11,310,250 B2
(45) Date of Patent: Apr. 19, 2022

(54) SYSTEM AND METHOD FOR MACHINE LEARNING-BASED REAL-TIME ELECTRONIC DATA QUALITY CHECKS IN ONLINE MACHINE LEARNING AND AI SYSTEMS

(71) Applicant: Bank of America Corporation, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 101 days.

(21) Appl. No.: 16/421,894

(22) Filed: May 24, 2019

(65) Prior Publication Data

US 2020/0374305 A1     Nov. 26, 2020

(51) Int. Cl.
| | | |
|---|---|---|
| H04L 9/40 | (2022.01) | |
| G06N 5/04 | (2006.01) | |
| G06N 20/00 | (2019.01) | |
| G06N 3/08 | (2006.01) | |
| H04L 29/06 | (2006.01) | |

(52) U.S. Cl.
CPC ......... H04L 63/1425 (2013.01); G06N 5/047 (2013.01); G06N 20/00 (2019.01); *G06N 3/08* (2013.01)

(58) Field of Classification Search
CPC .... H04L 63/1425; G06N 20/00; G06N 5/047; G06N 3/08
USPC .......................................................... 726/3
See application file for complete search history.

(56) References Cited

U.S. PATENT DOCUMENTS

| | | |
|---|---|---|
| 8,055,606 B2 | 11/2011 | Kreamer et al. |
| 8,386,401 B2 | 2/2013 | Virkar et al. |
| 8,417,715 B1 | 4/2013 | Bruckhaus et al. |
| 8,457,898 B2 | 6/2013 | Hartmann et al. |

(Continued)

FOREIGN PATENT DOCUMENTS

| | | | | |
|---|---|---|---|---|
| CA | 2837414 A1 | * | 6/2014 | ......... G06Q 30/0206 |
| CN | 112016525 A | * | 12/2020 | |

(Continued)

OTHER PUBLICATIONS

Huang et al., "Network-traffic anomaly detection with incremental majority learning," doi: 10.1109/IJCNN.2015.7280573, 2015, pp. 1-8 (Year: 2015).*

(Continued)

*Primary Examiner* — Peter C Shaw
(74) *Attorney, Agent, or Firm* — Moore & Van Allen PLLC; Seongun M. Hong (57) ABSTRACT

A system for machine learning-based real-time electronic data quality checks in online machine learning and AI systems is provided. In particular, the system may comprise a machine learning module which receives input data from a data quality learning module which serves to perform filtering or alteration functions on incoming data during the training and/or live phases of the machine learning module. Over time, the data quality module may increasingly become efficient and accurate at assessing incoming data to determine the data quality. In turn, improving data quality of input data may ensure that the various neural networks within the system produce adaptively accurate output values to drive the decisioning processes of the system.

20 Claims, 4 Drawing Sheets

(56) References Cited

U.S. PATENT DOCUMENTS

| | | | |
|---|---|---|---|
| 8,732,326 B2* | 5/2014 | Su | H04N 21/6373 709/231 |
| 8,862,522 B1 | 10/2014 | Jaiswal et al. | |
| 8,897,563 B1 | 11/2014 | Welling et al. | |
| 9,015,082 B1 | 4/2015 | Jaiswal et al. | |
| 9,298,788 B1* | 3/2016 | Kekre | G06F 16/248 |
| 9,351,128 B2* | 5/2016 | Anchan | H04L 1/0002 |
| 9,686,338 B1* | 6/2017 | Farrell | H04L 65/4092 |
| 9,716,791 B1* | 7/2017 | Moran | H04L 65/1076 |
| 9,916,194 B2 | 3/2018 | Pang | |
| 10,083,403 B2 | 9/2018 | Flores et al. | |
| 10,102,480 B2 | 10/2018 | Dirac et al. | |
| 10,241,505 B2 | 3/2019 | Cohen et al. | |
| 10,318,882 B2 | 6/2019 | Brueckner et al. | |
| 10,379,842 B2 | 8/2019 | Malladi et al. | |
| 10,628,943 B2 | 4/2020 | Hsieh et al. | |
| 10,673,880 B1* | 6/2020 | Pratt | G06N 20/00 |
| 10,977,389 B2* | 4/2021 | Margalit | G06F 21/6254 |
| 2008/0052774 A1* | 2/2008 | Chesla | G06F 21/552 726/13 |
| 2013/0198119 A1* | 8/2013 | Eberhardt, III | G06N 20/00 706/12 |
| 2015/0140981 A1* | 5/2015 | Balasaygun | H04M 15/853 455/418 |
| 2015/0293755 A1* | 10/2015 | Robins | G06F 9/44526 717/104 |
| 2015/0379072 A1 | 12/2015 | Dirac et al. | |
| 2015/0379428 A1 | 12/2015 | Dirac et al. | |
| 2015/0379429 A1 | 12/2015 | Lee et al. | |
| 2016/0155069 A1 | 6/2016 | Hoover et al. | |
| 2016/0267082 A1 | 9/2016 | Wong et al. | |
| 2017/0372232 A1 | 12/2017 | Maughan et al. | |
| 2018/0316727 A1* | 11/2018 | Tsironis | H04L 63/20 |
| 2018/0330281 A1 | 11/2018 | Teller et al. | |
| 2018/0337871 A1* | 11/2018 | Matta | G06N 20/00 |
| 2019/0370610 A1* | 12/2019 | Batoukov | G06F 11/0793 |
| 2020/0374305 A1* | 11/2020 | Kursun | H04L 63/1425 |

FOREIGN PATENT DOCUMENTS

| | | | | |
|---|---|---|---|---|
| CN | 112703457 A | * | 4/2021 | G01M 13/028 |
| WO | WO-2009130190 A1 | * | 10/2009 | G06F 21/46 |

OTHER PUBLICATIONS

Wankhede et al., "Anomaly Detection using Machine Learning Techniques," doi: 10.1109/I2CT45611.2019.9033532, 2019, pp. 1-3. (Year: 2019).*

Aldairi et al., "A Trust Aware Unsupervised Learning Approach for Insider Threat Detection", IEEE, doi: 10.1109/IRI.2019.00027, 2019, pp. 89-98. (Year: 2019).*

Pham et al., "Machine learning techniques for web intrusion detection—A comparison", IEEE, doi: 10.1109/KSE.2016.7758069, 2016, pp. 291-297. (Year: 2016).*

Lin et al., "Hybrid Real-Time Matrix Factorization for Implicit Feedback Recommendation Systems", IEEE, doi: 10.1109/ACCESS.2018.2819428, pp. 21369-21380, 2018. (Year: 2018).*

Sunny et al., "Implementation of a self-adaptive real time recommendation system using spark machine learning libraries", IEEE, doi: 10.1109/SPICES.2017.8091310, 2017, pp. 1-7. (Year: 2017).*

Chu et al., "Data stream mining architecture for network intrusion detection", IEEE, doi: 10.1109/IRI.2004.1431488, 2004, pp. 363-368. (Year: 2004).*

Garcia-Vico et al., "FEPDS: A Proposal for the Extraction of Fuzzy Emerging Patterns in Data Streams", IEEE, doi: 10.1109/TFUZZ.2020.2992849, pp. 3193-3203, Dec. 2020. (Year: 2020).*

Shakeri et al., "A fuzzy constrained stream sequential pattern mining algorithm", IEEE, doi: 10.1109/ISTEL.2014.7000663, 2014, pp. 20-24. (Year: 2014).*

Borah et al., "Mining patterns from data streams: An overview", IEEE, doi: 10.1109/I-SMAC.2017.8058373, 2017, pp. 371-376. (Year: 2017).*

Suseendran et al., "Deep learning frequent pattern mining on static semi structured data streams for improving fast speed and complex data streams", IEEE, doi: 10.1109/ICOA51614.2021.9442621, 2021, pp. 1-8. (Year: 2021).*

* cited by examiner

SYSTEM AND METHOD FOR MACHINE LEARNING-BASED REAL-TIME ELECTRONIC DATA QUALITY CHECKS IN ONLINE MACHINE LEARNING AND AI SYSTEMS

FIELD OF THE INVENTION

The present disclosure embraces a system for machine learning-based real-time electronic data quality checks in online machine learning and AI systems. In particular, the system may use a data quality learning module in conjunction with a machine learning module to dynamically filter electronic data streams with increasing effectiveness and efficiency over time.

BACKGROUND

Machine learning systems using conventional adaptation process or modes may face a number of technological challenges when processing real-time data. In particular, conventional system using specified "exception conditions" to detect aberrant data inputs may face challenges resulting from the static and relatively inflexible nature of such a paradigm. For instance, a neural network may not be able to successfully detect scenarios which fall outside of the defined exception conditions, which may reduce the effectiveness of the decisioning processes of the neural network. Accordingly, there is a need for a more dynamic way to improve the functioning of such neural networks.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a novel system for machine learning-based real-time electronic data quality checks in online machine learning and AI systems. In particular, the system may comprise a machine learning module which receives input data from a data quality learning module which serves to perform filtering or alteration functions on incoming data during the training and/or live phases of the machine learning module. Over time, the data quality module may increasingly become efficient and accurate at assessing incoming data to determine the data quality. In turn, improving data quality of input data may ensure that the various neural networks within the system produce adaptively accurate output values to drive the decisioning processes of the system.

Dynamic Exception Conditions

The proposed solution uses real-time analysis and emerging data patterns (along with losses, policy guidelines, adversarial attack patterns, or the like) to dynamically adjust exception conditions. This enables more robust and reliable operation of the machine learning system, as it may close security holes that may be used by unauthorized users.

Standalone Data Quality Module

The proposed approach uses real-time continuous data quality analysis through a learning engine that is fully integrated in the flow. The data quality engine pre-processes and post-processes each transaction such that an initial data quality and adversarial score is generated for each incoming transaction. Dynamic exception conditions may be based on the adversarial patterns learned and/or historic data quality patterns. An input to the machine learning module may be provided to (i) provide rectification/corrections for one or more features; (ii) adjust threat scoring based on data quality register; and/or (iii) not perform transaction threat scoring based on the incoming transaction data. Said input may be calculated with (i) historical transaction patterns; (ii) static data gathering of the features and machine learning algorithms; (iii) policy guidelines in decision making processes (e.g., where policies dictate in which cases the machine learning engine should score or not score; and/or (iv) potential loss.

Data Quality Assessment Optimized

The system integrates and uses key data inputs along with dynamic/adjustable optimization criteria to adjust to real-time patterns. The system may perform optimization of data quality according to various parameters, including design/training-time historical data gathering of data quality patterns and associated static exception conditions; real-time/in-situ data gathering of data patterns when the machine learning system is employed in the real-time environment; feeds from known adversarial/machine learning attack types that are used by malicious or unauthorized users (historical and emerging trends updated in real-time); policy and rule based guidelines for the data quality (e.g., a scoring engine may not be able generate a score if only half of the features pass the quality checks under certain circumstances. In other circumstances, the system may be allowed to as instructed by the rules and policies that govern the system); loss and mis-prediction evaluation (e.g., the proposed system uses historical, emerging loss patterns to determine what data quality issues result in losses and others don't result in losses), or the like.

Metric Based Evaluation of Data Quality

The proposed system uses machine learning techniques/neural networks and other techniques to generate metrics on data quality. Said metrics may then be fed into the machine learning engine to factor into the decision making process.

Machine Learning Engine for Data Quality Assessment

The proposed system uses a reinforcement learning engine to dynamically learn data quality patterns. In particular, the system may provide positive or negative reinforcement depending on the outcomes based on the outputs provided by the machine learning module.

Data Quality Corrections

The proposed system may use historical data and learned data quality patterns to rectify selected data quality issues in real-time, which then gets fed into the decision engine. In particular, the system may (i) fill in missing transaction data for known patterns; (ii) rectify data patterns (such as fuzzy matching, formatting corrections, or the like); and/or (iii) adjust one or more features to ensure the data is presented to the decision engine to generate the outcome with least detriment.

Real-Time Recommendations

The proposed data quality engine (besides creating exception conditions, data quality metrics, corrections and optimizations) can also provide recommendations as to what the machine learning engine should do with the data. This process may involve further remediation or corrections of the data, not performing scoring, engaging other rule/strategies, or the like.

Look up Tables, Policy Tables and Other Reference Data Storage

The system may further comprise a data repository where the data gathering, guidelines and rules as described herein are stored within the system. In some embodiments, the system may update the reference data and tables in real-time using learning and model performance.

Accordingly, embodiments of the present disclosure provide a system for machine learning-based real-time electronic data quality checks. The system may comprise a memory device with computer-readable program code stored thereon; a communication device; and a processing device operatively coupled to the memory device and the communication device. The processing device may be configured to execute the computer-readable program code to continuously monitor and analyze, in real-time, an input data stream via a data quality learning module according to a set of data quality criteria; based on analyzing the input data stream, dynamically adjust a set of exception criteria; transmit a data quality output from the data quality learning module to a machine learning module; and based on the data quality output, generate, via the machine learning module, a machine learning output.

In some embodiments, the set of data quality criteria comprises an analysis of an emerging threat pattern from the input data stream.

In some embodiments, the set of data quality criteria comprises an analysis of a historical data pattern.

In some embodiments, the set of data quality criteria comprises an analysis of an emerging loss pattern based on a data quality issue.

In some embodiments, the set of data quality criteria comprises rule-based guidelines for data quality.

In some embodiments, the set of data quality criteria are stored in a look up table, a policy table, or a reference data repository.

In some embodiments, the system further comprises a reinforcement learning engine, wherein the reinforcement learning engine provides positive or negative reinforcement according to the machine learning output.

In some embodiments, the data quality output comprises instructions on processing the input data stream.

In some embodiments, the instructions on processing the input data stream comprise a remediation or correction of the input data stream.

In some embodiments, the executable code further causes the processor to generate, in real-time, a metric on data quality.

In some embodiments, the executable code further causes the processor to rectify, in real-time, data quality issues in the input data stream using historical data patterns and data quality patterns.

In some embodiments, the input data stream comprises a transaction request, wherein rectifying data quality issues in the input data stream comprises filling in missing transaction data for the transaction request.

In some embodiments, rectifying data quality issues in the input data stream comprises rectifying data patterns using fuzzy matching or formatting corrections.

In some embodiments, rectifying data quality issues in the input data stream comprises adjusting the set of exception criteria to minimize negative reinforcement of the machine learning output.

Embodiments of the present disclosure also provide a standalone data quality learning module for machine learning-based real-time electronic data quality checks. The module may comprise a memory device with computer-readable program code stored thereon; a communication device; and a processing device operatively coupled to the memory device and the communication device. The processing device may be configured to execute the computer-readable program code to continuously monitor and analyze, in real-time, an input data stream via a data quality learning module according to a set of data quality criteria; based on analyzing the input data stream, dynamically adjust a set of exception criteria; transmit a data quality output from the data quality learning module to a machine learning module; and based on the data quality output, generate, via the machine learning module, a machine learning output.

In some embodiments, the set of data quality criteria comprises an analysis of an emerging threat pattern from the input data stream.

In some embodiments, the set of data quality criteria comprises an analysis of a historical data pattern.

Embodiments of the present disclosure also provide a computer-implemented method for machine learning-based real-time electronic data quality checks. The method may comprise continuously monitoring and analyzing, in real-time, an input data stream via a data quality learning module according to a set of data quality criteria; based on analyzing the input data stream, dynamically adjusting a set of exception criteria; transmitting a data quality output from the data quality learning module to a machine learning module; and based on the data quality output, generating, via the machine learning module, a machine learning output.

In some embodiments, the set of data quality criteria comprises an analysis of an emerging threat pattern from the input data stream.

In some embodiments, the set of data quality criteria comprises an analysis of a historical data pattern.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" or "data quality system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Neural network" as referred to herein may refer to a network of computing nodes that use machine learning algorithms to accomplish certain tasks. Broadly, neural networks may be used for tasks requiring pattern recognition. For instance, a neural network may be constructed and used for the purposes of speech recognition, facial recognition, detection of unauthorized activity, machine translation, gaming AI, or the like.

"Node" or "neuron" as used herein may refer to a functional unit within the neural network which may receive inputs, perform calculations based on the inputs, and produce outputs based on the calculations. In some embodiments, each node may be configured to produce an output only when the aggregated weighted inputs exceeds a certain threshold. Nodes may be structured such that some of the nodes receive inputs and/or outputs from other nodes. Based on the inputs received, the calculations performed on the inputs may change over time. For instance, a set of nodes may change the weights or biases for certain inputs based on learning algorithms (e.g., machine learning). In some embodiments, nodes may be arranged into layers, where each "layer" of nodes is configured to accomplish a specific task within the overarching objective of the neural network. Typically, the neural network comprises an input layer, and output layer, and one or more hidden layers in between the input layer and output layer, such that a neural network receives one or more signals through the input layer, at which point the signals propagates through the various layers of the neural network before reaching the output layer. Accordingly, in some embodiments, a neural network may itself be considered to be a node.

Embodiments of the present disclosure provide a dynamic and adaptive system for performing data quality checks for real-time machine learning algorithms. The system may use a "data quality learning module" or "data quality engine" which may transform (e.g., filter, redact, format, or otherwise modify) incoming data before providing the transformed data to a "machine learning module" or "machine learning engine," where the data quality learning module and machine learning module may each comprise hardware and/or software to implement automated computing system-based solutions to various problems. In this regard, both modules may use learning algorithms, logic gates, neural networks, and/or other artificial intelligence-based processes to adaptively become more effective and/or efficient in performing a given task.

The data quality learning module may receive input data from a data stream (e.g., training data or real-world data) and subsequently perform various types of iterative analyses and/or adjustments to the input data based on the decisioning processes of the machine learning module. In this way, the data quality learning module may reduce the incidence of low quality data (e.g., data which may be impossible or nonsensical, incorrectly formatted, exceeds acceptable bounds, or the like). Upon receiving said low quality data, the data quality learning module may correct or modify the data or, in some embodiments, prevent the data from being transmitted to the machine learning module. As a result, the machine learning module is provided with an overall higher quality of input data, which in turn allows the machine learning module to increase the efficiency of its learning or training processes while becoming more effective accomplishing its assigned tasks.

In an exemplary embodiment, the machine learning module may be configured to detect attempts by unauthorized users to access the entity system (e.g., to execute unauthorized transactions), where the entity may be a financial institution. In this regard, the machine learning module may provide an output to the entity which indicates whether a transaction request is genuine. In such embodiments, the data quality learning module may intake a set of input data (e.g., a request to execute a transaction in a particular city) and analyze the input data based on certain factors. For instance, the data quality learning module may analyze the input data according to policy guidelines of the entity (e.g., rejection of transactions occurring in the future or within a nonexistent city), loss and/or mis-prediction patterns (e.g., cases in which similarly patterned input data has resulted in losses for the entity), adversarial and/or attack patterns (e.g., behavior patterns of malicious or unauthorized users), historical pattern analysis and/or learning, or the like. Based on the assessment of the input data, the data quality learning module may make adjustments or corrections of the input data to rectify data quality issues in real time. For instance, such adjustments and/or corrections may include filling gaps in incomplete data, rectifying data patterns (e.g., fuzzy matching, formatting corrections, or the like), and/or other adjustments in order to place the input data into a form which may allow the machine learning module to make accurate decisions.

The data quality engine may further provide real-time recommendations to the machine learning module (e.g., recommend that the machine learning module score a particular transaction as unauthorized activity, performing further corrections to the data, or the like). In turn, the machine learning engine may, in some embodiments, score the input data as being authorized or unauthorized. In some embodiments, the system may comprise a reinforcement learning engine which uses a positive and negative system to coordinate the training/learning of the machine learning module. For instance, when the output of the machine learning module results in a favorable outcome (e.g., a correct assessment of unauthorized activity), the machine learning module may receive a positive metric. Conversely, when the output of the machine learning module results in a negative outcome (e.g., an incorrect assessment of unauthorized activity or failure to detect unauthorized activity which results in a negative impact to the entity), the machine learning module may receive a negative metric. In this way, the machine learning module may, in conjunction with the data quality learning module, become iteratively more efficient and effective in its assigned role and/or functions over time through reinforcement of the neural network structures.

The system as described herein confers a number of technological advantages over systems which use conventional methods of detecting unauthorized user activity. In particular, by dynamically analyzing input data in real-time (e.g., based on historical patterns, policy data, attack patterns, or the like), the system is able to overcome the rigidity of traditional detection methods, which in turn greatly increases the efficacy of the learning and performance of machine learning engines. In turn, the system as described herein may strengthen the security of the entity system through enhanced detection of unauthorized user activity.

Figure 1:
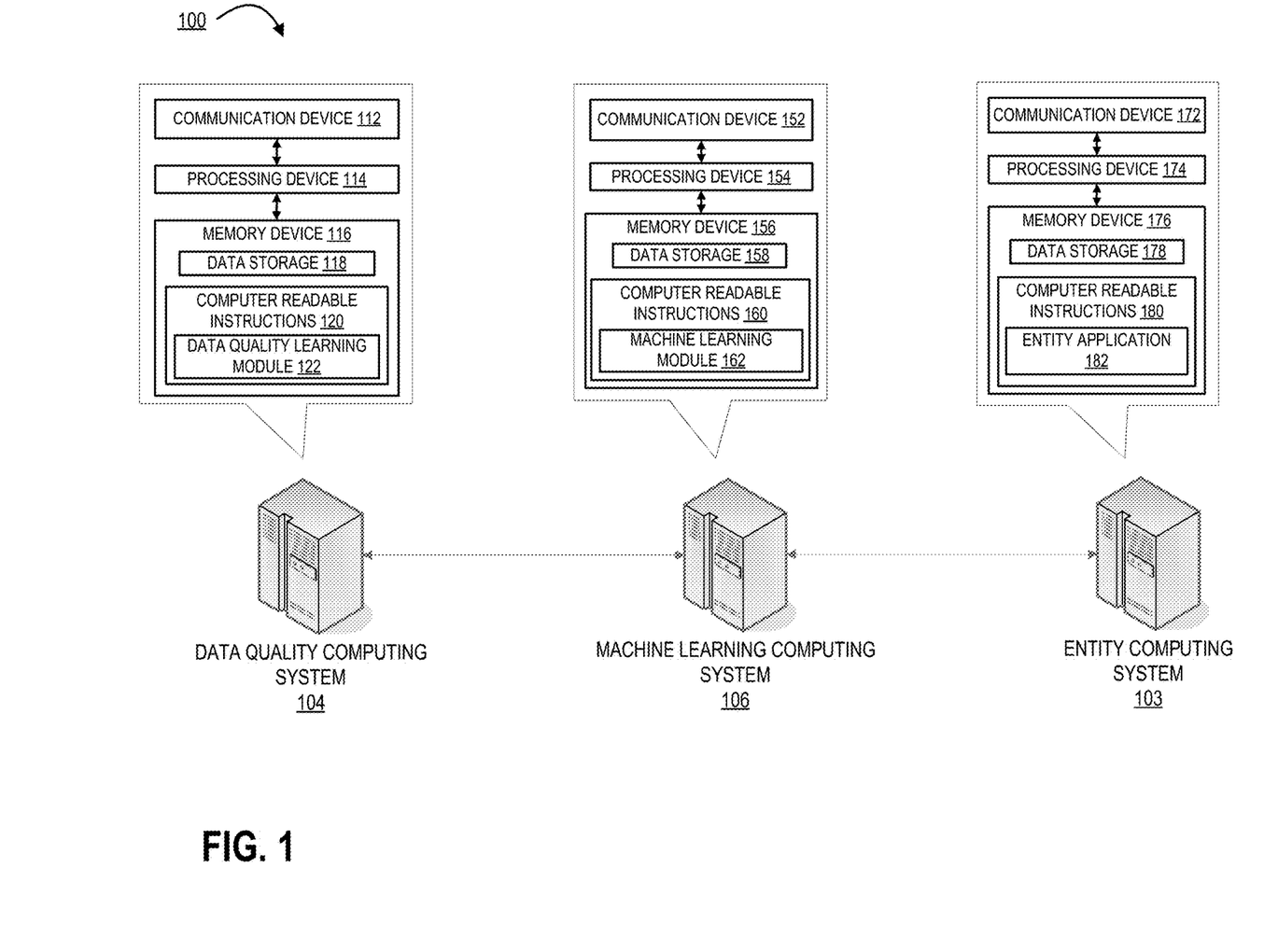
FIG. 1 illustrates an operating environment for the real-time data quality system, in accordance with one embodiment of the present disclosure.

Turning now to the figures, FIG. 1 illustrates an operating environment 100 for the real-time data quality system, in accordance with one embodiment of the present disclosure. In particular, FIG. 1 illustrates a machine learning computing system 106 that is operatively coupled, via a network, to a data quality computing system 104 and/or an entity computing system 103. In such a configuration, the machine learning computing system 106 may transmit information to and receive information from the data quality computing system 104 and/or the entity computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, the functions of the machine learning computing system 106 and the data quality computing system 104 may be executed on a single computing system. Furthermore, a single system, device, or server as depicted in FIG. 1 may represent multiple systems, devices, or servers. For instance, the singular data quality computing system 104 may represent multiple data quality systems executing processes in parallel.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the machine learning computing system 106 may comprise a communication device 152, a processing device 154, and a memory device 156. The machine learning computing system 106 may be owned and/or operated by an entity such as an Internet service provider, financial institution, business organization, government agency, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the data quality computing system 104 and/or the entity computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a machine learning module 162 which allows the entity system to perform various functions related to data characterization, tracking, management, and other related functions as described herein. In some embodiments, the memory device 156 includes data storage 158 for storing data related to the system environment, but not limited to data created and/or used by the machine learning module 162. The machine learning module 162 may comprise computer-executable program code which may instruct the processing device 154 to perform certain logic, data processing, and data storing functions of the application to accomplish the entity's objectives. For instance, the machine learning module 162 may receive input data and, based on the input data, produce an output with respect to a particular task assigned to the machine learning module 162 (e.g., detection of unauthorized users). The machine learning module 162 may, through training and/or iterative processes, become increasingly effective at accomplishing the given task over a period of time.

As further illustrated in FIG. 1, the data quality computing system 104 may be a computing system which is owned and/or operated by the entity for the purposes of improving the quality of the input data received by the machine learning computing system 106. In this regard, the data quality computing system 104 may be, for example, a networked terminal, server, desktop computer, or the like, though it is within the scope of the disclosure for the data quality computing system 104 to be a portable device such as a cellular phone, smart phone, smart device, personal data assistant (PDA), laptop, or the like. The data quality computing system 104 generally comprises a communication device 112, a processing device 114, and a memory device 116, where the processing device 114 is operatively coupled to the communication device 112 and the memory device 116. The processing device 114 uses the communication device 112 to communicate with the network and other devices on the network, such as, but not limited to the machine learning computing system 106 and/or the entity computing system 103. As such, the communication device 112 generally comprises a modem, antennae, WiFi or Ethernet adapter, radio transceiver, or other device for communicating with other devices on the network.

In some embodiments, the data quality computing system 104 may further comprise a neural network device which may include a hardware, software, or part hardware and software implementation of a neural network. Accordingly, the neural network may be a multilayer perceptron, Boltzmann machine, Markov chain, long/short term memory (LSTM), recurrent neural network (RNN), or the like.

The data quality computing system 104 comprises computer-readable instructions 120 and data storage 118 stored in the memory device 116, which in one embodiment includes the computer-readable instructions 120 of a data quality learning module 122. The data quality learning module 122 may comprise executable code portions for performing functions related to the improvement of input data quality. For instance, the data quality computing system 104 may receive input data from a data source (e.g., training data and/or live production data) and perform one or more processes on the input data (e.g., redaction, replacement, correction, or the like) and provide the input data to the machine learning computing system 106. In some embodiments, the data quality computing system 104 may further provide recommendations and/or interpretations of the input data to the machine learning computing system 106 (e.g., whether or not to score a transaction request, whether to execute certain remedial or other strategic patterns, or the like).

The operating environment 100 may further comprise an entity computing system 103. The entity computing system 103 may refer to a computing system which may receive output data from the machine learning computing system 106 and execute one or more processes based on the output data. In some embodiments, the entity computing system 103 may be operated by a user such as an administrator or employee of the entity. Accordingly, the entity computing system 103 may also comprise a processing device 174 operatively coupled to the communication device 172 and a memory device 176 comprising data storage 178 and computer readable instructions 180.

The computer readable instructions 180 may comprise an entity application 182 which may be configured to instruct the processing device 174 to execute certain functions over the network, such as interacting with the machine learning computing system 106, application computing system 105, and/or the data quality computing system 104. In particular, the entity application 182 receive output data from the machine learning module 162, where the output data may be a decision or recommendation generated by the machine learning module 162. For instance, the output data may be an indication that a particular transaction request is unauthorized and thus should not be processed. In some embodiments, the computer readable instructions 180 may further comprise a data repository which may store look up tables, policy tables, or other reference data to be used in the data quality refinement process.

The communication device 172, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the entity computing system 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 102, may include any of a number of devices allowing the devices to receive data from a user 102, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

Figure 2:
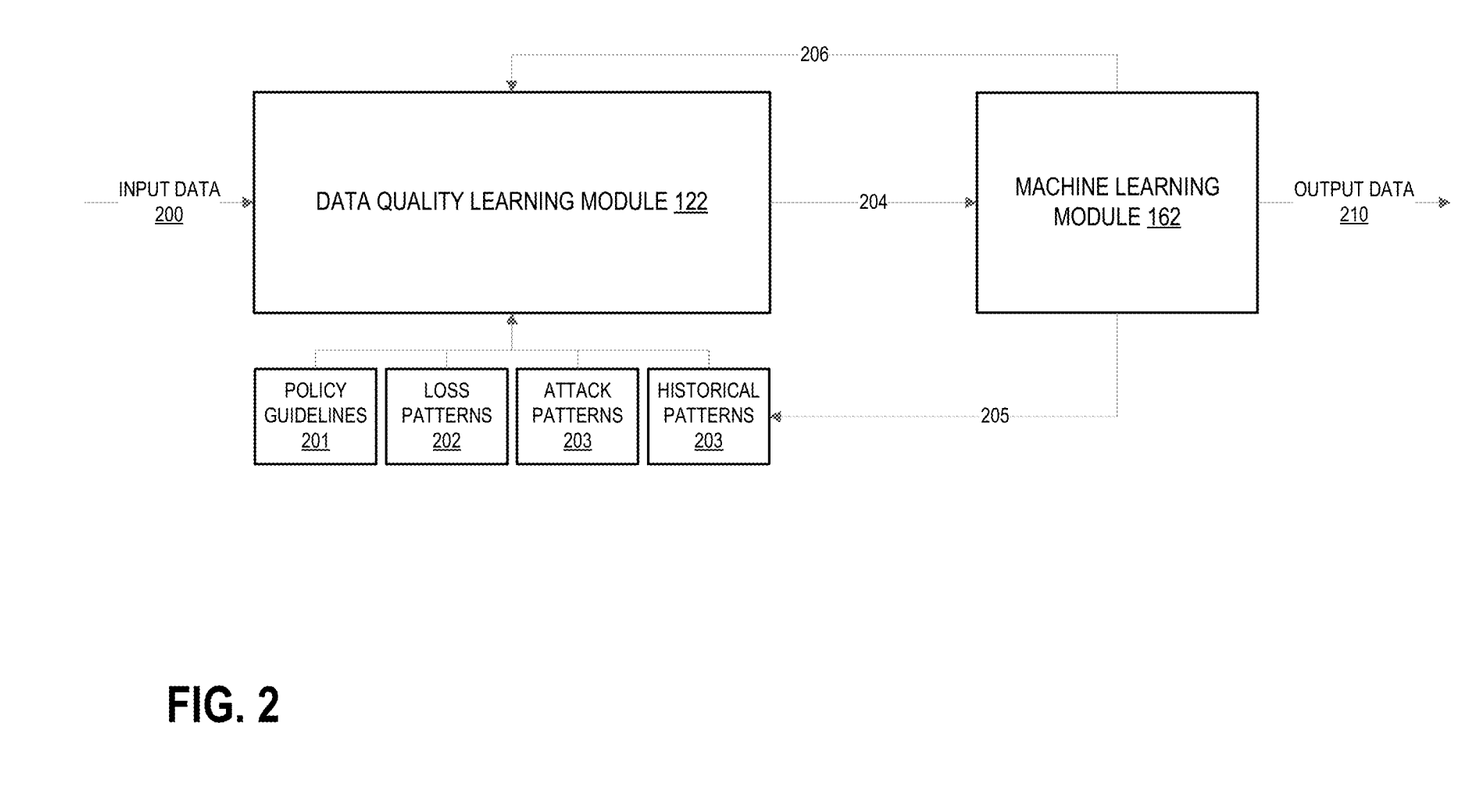
FIG. 2 illustrates the logical structures within the real-time data quality system, in accordance with one embodiment of the present disclosure.

FIG. 2 illustrates the logical structures within the real-time data quality system, in accordance with one embodiment of the present disclosure. In particular, the data quality learning module 122 may receive input data 200 from an incoming data stream. The input data 200 may, in some embodiments, be a request to complete a transaction. In such an embodiment, the data quality learning module 122 may analyze the input data 200 based on a number of factors, metrics, and/or criteria. A number of non-limiting examples of such criteria follows. For instance, the data quality learning module 122 may analyze the input data 200 according to one or more policy or rule guidelines 201. The policies may be set by the entity itself or by third party entities (e.g., regulatory agencies, affiliate organizations, or the like). Such policies may include rules concerning whether a certain transaction should be scored (e.g., whether or not the machine learning module should consider the transaction to be unauthorized). For example, if the input data 200 includes a transaction request for a transaction occurring several years into the future or taking place in a non-existent city, the policy or rules may require that the transaction request is rejected (e.g., the machine learning module and/or the data quality learning module 122 produces an output indicating that the transaction is unauthorized).

In some embodiments, the data quality learning module 122 may analyze the input data 200 according to one or more loss patterns 202. The loss patterns 202 may include data regarding instances in which incorrect decisions made by the machine learning module 162 have resulted in a loss for the entity. For instance, if the machine learning module 162 incorrectly allows an unauthorized user or application to become authenticated, the entity may suffer a data loss through improper manipulation, data corruption, or the like. In other embodiments, the loss patterns 202 may reflect losses in trust of the users in the entity system as a result of incorrect decisioning by the machine learning module 162 (e.g., allowing an invalid or unauthorized transaction to be executed).

The data quality learning module 122 may further analyze the input data 200 according to one or more attack patterns 203, where the attack patterns 203 may include data regarding patterns of requests and/or behaviors used by unauthorized users to gain access to the system and/or execute unauthorized actions, or other patterns or combinations designed to circumvent the system.

The data quality learning module 122 may further analyze the input data 200 according to one or more historical patterns 204, where the historical patterns 204 may include information such as historical transaction patterns, previous decisions reached by the system, historical decisioning outcomes, or the like. In an exemplary embodiment, the incoming input data 200 may be a transaction request from a networked terminal within the entity system. In such an embodiment, the data quality learning module 122 may access historical patterns 204 associated with the specific networked terminal over a set time frame (e.g., weekly, monthly, yearly, or the like) to identify data quality issues that may occur with the particular networked terminal.

Based on the data and/or criteria as described above, the system may dynamically generate exception conditions based on the incoming input data 200 to identify and/or rectify data quality issues in real time. In an exemplary embodiment, a transaction request may reference a non-existent city in which the transaction is to take place, where the non-existent city does not yet appear in the reference data repositories. In such an embodiment, the data quality learning module 122 may use the criteria as described above to determine that the transaction is invalid. For instance, the policy guidelines may indicate that transactions occurring in a non-existent city should be rejected; the loss patterns may indicate that transactions including the non-existent city have resulted in damage to the entity; the attack patterns may indicate that inclusion of said non-existent city in the transaction request is an attempt by unauthorized users, and the like. In embodiments in which the input data 200 comprises a transaction request, the data quality learning module 122 may generate an initial data quality score and a threat score for the transaction.

Based on said analysis, the data quality learning module 122 may produce a data quality output 205 and transmit the data quality output 205 to the machine learning module 162. The data quality output 205 may include such information as a data quality score (e.g., a numerical indication of the quality of the input data 200. Higher values may be correlated with a high quality of input data 200, whereas lower values may be correlated with a low quality of input data 200), dynamically generated exception conditions as described above, or corrections and/or rectifications of the input data 200. In some embodiments, the data quality output 205 may further provide recommendations to the machine learning module 162 on how to process the data quality output 205. For instance, one recommendation may include an indication that, based on the low quality of the input data 200, the machine learning module 162 should identify an incoming transaction as invalid. In some embodiments (e.g., during a training process of the machine learning module 162), the machine learning module 162 may in turn provide scenario data 206 based on historical data and possible scenarios provided to the machine learning module 162. The machine learning module 162 may further provide real-time feedback 207 to the data quality learning module 122 regarding the measure of data quality, attack patterns, and/or recommendations as provided in the data quality output 205. In turn, this allows the data quality learning module 122 to adjust its learning processes to more effectively assess and refine the data quality of the input data 200 over time.

Based on the data quality output 205 received from the data quality learning module 122, the machine learning module 162 may produce output data 210 and transmit the output data 210 to a computing system within the entity's network (e.g., the entity computing system 103), where the output data 210 may comprise a decision or action step regarding one or more tasks assigned to the machine learning module 162. Continuing the previous example of detection of unauthorized transactions, the output data 210 may include a recommendation to block the unauthorized transaction. In some embodiments, the output data 210 may be used as a trigger to automatically block the unauthorized transaction from occurring.

Figure 3:
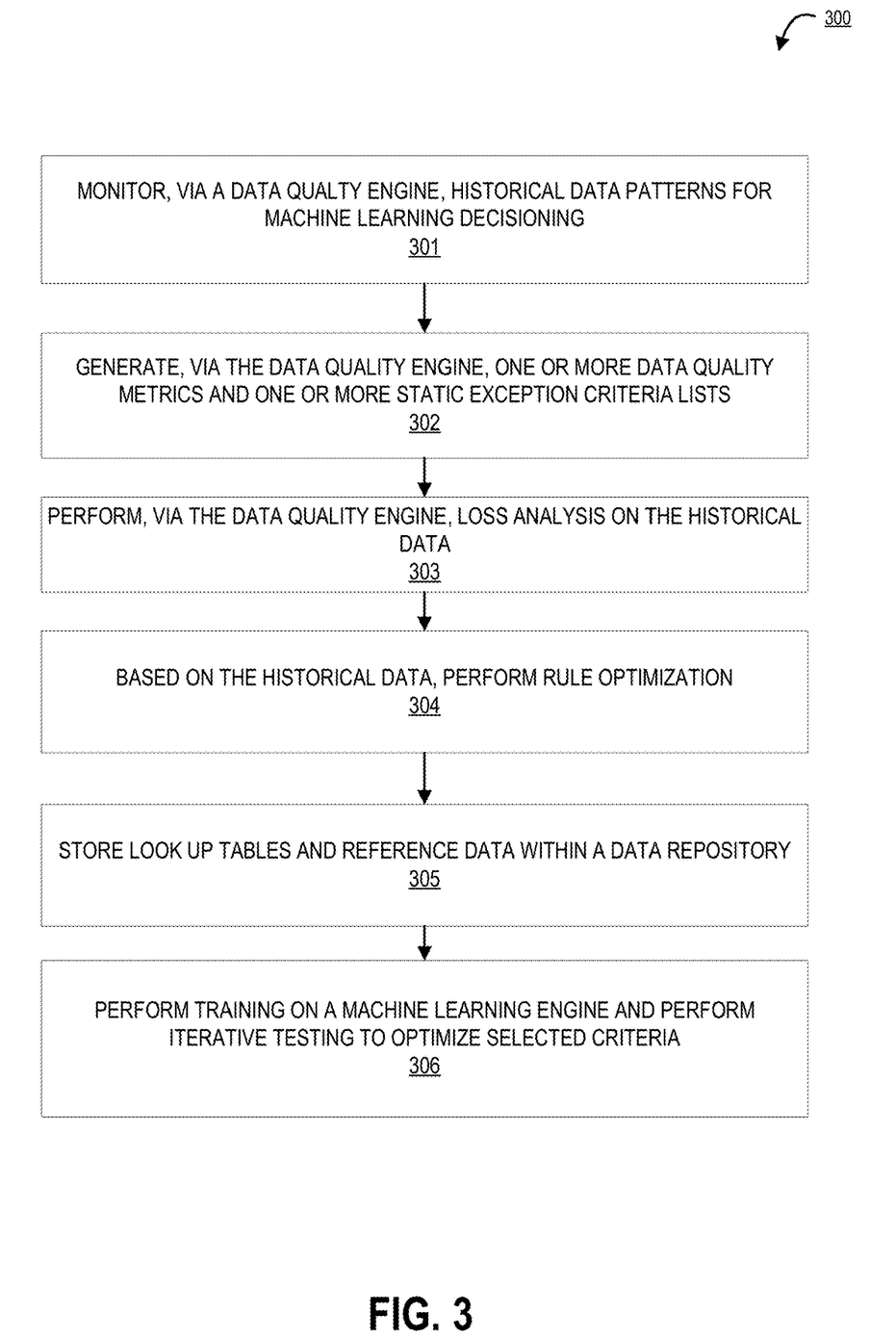
FIG. 3 illustrates a process flow for a configuration process of the machine learning module.

FIG. 3 illustrates a process flow 300 for a configuration process of the machine learning module, in accordance with some embodiments of the present disclosure. The process 300, which may include a method for training the machine learning module and/or the data quality learning module, begins at block 301, where the system monitors, via a data quality engine, historical data patterns for machine learning decisioning. The system may continuously monitor historical data in real time according to various metrics in order to promote adaptation of the machine learning modules described herein. For instance, the system may monitor historical data regarding input data, common threat patterns, decisioning outcomes, accuracy of decisioning, past user interactions, or the like.

The process continues to block 302, where the system generates, via the data quality engine, one or more data quality metrics and/or one or more static exception criteria lists. The data quality metrics generated may include several different types of criteria along which the incoming data is to be assessed, such as policy guidelines, attack/threat patterns, loss patterns, historical data and/or patterns, or the like. Furthermore, the system may generate static exception criteria lists based on the historical data. For instance, if the historical data indicates that a new exception criterion should be created (e.g., invalid transactions having a certain attribute have resulted in losses for the entity), then the system may include said exception criterion in the generated exception criteria list.

The process continues to block 303, where the system performs, via the data quality engine, loss analysis on the historical data. As described above, loss patterns may be one of the criteria used by the data quality learning module to assess data quality. Loss patterns may include, for example, an instance in which the machine learning module has failed to correctly score a transaction as invalid or unauthorized, which in turn resulted in losses for the entity (e.g., loss in data security, computing resources spent processing invalid transactions, loss of trust of users in the entity system, or the like).

The process continues to block 304, where the system, based on the historical data, performs rule optimization. In particular, the system may add new policies, rules, or guidelines and/or modify existing policies, rules or guidelines. Continuing the previous example, the system may determine that a particular historical pattern (e.g., a method historically used by unauthorized users) have resulted in losses for the entity. In such an embodiment, the system may dynamically generate a policy or rule regarding the historical pattern (e.g., if a transaction request comprises the unauthorized activity, then score the transaction as invalid or unauthorized).

The process continues to block 305, where the system stores look up tables and reference data within a data repository. Said look up tables and reference data may be generated based on the historical patterns analyzed and/or new rules or policies created as described above. The look up tables and reference data may be stored for later use by the data quality learning module and/or the machine learning module.

The process continues to block 306, where the system performs training on a machine learning engine and performs iterative testing to optimize selected criteria. In particular, the system may train the machine learning module using the various data quality metrics, analysis of the historical data, rule optimization, and/or look up tables or reference data. In this way, the system may optimize the performance of the machine learning module both before and during implementation within the production environment.

Figure 4:
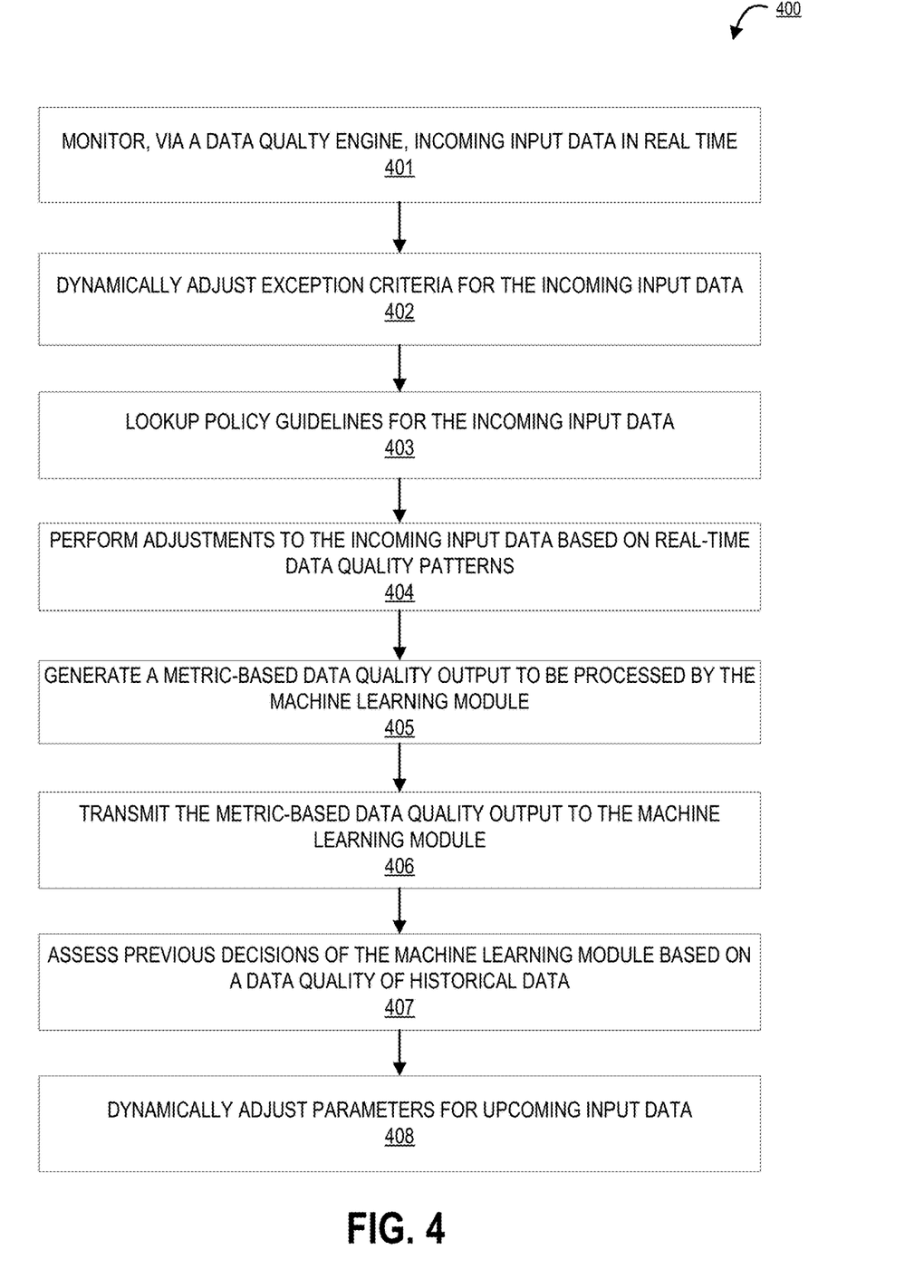
FIG. 4 illustrates a process flow for real-time data quality checks, in accordance with one embodiment of the present disclosure.

FIG. 4 illustrates another process flow 400 for real-time data quality checks, in accordance with one embodiment of the present disclosure. The process begins at block 401, where the system monitors, via a data quality engine, incoming input data in real time. At this stage, the machine learning module and/or the data quality learning module may have been deployed into the production environment. In such embodiments, the data quality learning module may continuously monitor and assess data quality of incoming data streams. For instance, in one embodiment, the incoming input data stream may include transaction requests, where the transaction requests may include transaction data and/or metadata (e.g., the amount of resources to be transferred, geographic location of the transaction, sender information, recipient information, or the like). In this way, the data quality learning module may constantly increase the level of data quality of the data received by the machine learning module.

The process continues to block 402, where the system dynamically adjusts exception criteria for the incoming input data. In some embodiments, the adjustment of exception criteria may be processed using historical data. For instance, if the historical data indicates that transaction requests which designate a certain non-existent city or invalid timeline are commonly discovered to be invalid or improper, the system may automatically adjust exception criteria to include the problematic non-existent city or timeline. In some embodiments, the data quality learning module may further use machine learning to conduct predictive analysis using historical data. For instance, the data quality learning module may detect patterns in invalid city designations such that subsequent transaction requests which designate an invalid city that does not appear in look up tables or reference data may nevertheless be identified as invalid.

The process continues to block 403, where the system accesses policy guidelines for the incoming input data. Policy guidelines may include one or more policies or rules regarding the types of data to be processed by the machine learning module. For instance, if the incoming input data comprises transaction requests, then the policy guidelines may include certain requirements for the transaction to be considered valid (e.g., the transaction must designate a valid city or time, conform to resource transfer limits, be supported by authentication credentials, or the like).

The process continues to block 404, where the system performs adjustments to the incoming input data based on real-time data quality patterns. Said adjustments may include additions, redactions, modifications, or other types of changes to the input data based on the various criteria for data quality. Continuing the previous example, the input data may contain a transaction request that references a non-existent account or is missing a transaction time. That said, in some embodiments, the system may detect that the error is accidental and subsequently rectify the error automatically (e.g., by rewriting the data to reference the correct account or automatically populating time data).

The process continues to block 405, where the system generates a metric-based data quality output to be processed by the machine learning node. The data quality output may comprise a data quality score which may indicate a quantitative measure of the level of data quality of the input data, where the data quality score reflects the analysis of the input data based on various criteria as described above. For instance, on a scale of 1 to 100, a data quality score of 90 may indicate a relatively high level of quality of the input data, whereas a data quality score of 25 may indicate a relatively low level of quality. Based on the data quality score, the machine learning module may change its decisioning processes, which may in turn affect the output of the machine learning module. For instance, a low data quality score may make the machine learning module more likely to produce an output which indicates that the input data (e.g., a transaction request) is invalid.

The data quality output may further comprise input data which have been corrected or rectified by the data quality learning module as described above. In addition, the data quality output may comprise a recommendation generated by the data quality learning module on how to process the input data. For instance, the data quality learning module may, based on a dynamically generated exception condition, recommend that a certain transaction is scored as invalid or unauthorized.

The process continues to block 406, where the system transmits the metric-based data quality output to the machine learning module. Based on the data quality output, the machine learning module may use decisioning processes to produce an output to the entity system. For instance, the output may be a decision to score a particular transaction as invalid. In some embodiments, such a decision may be automatically implemented (e.g., a process to automatically block the transaction from proceeding).

The process continues to block 407, where the system assesses previous decisions of the machine learning module based on a data quality of historical data. In this regard, the system may continuously log and store decisioning outputs and outcomes within a data repository in order to track the performance of the machine learning module. The system may then correlate the data quality of input data (e.g., transaction data) over time (including recent and historical transaction data) with the decisioning outcomes (e.g., positive or negative) of the outputs generated by the machine learning module.

The process continues to block 408, where the system dynamically adjusts parameters for upcoming input data. Based on the previous decisions of the machine learning module, the system may tweak parameters (e.g., data quality criteria, exception criteria, or the like) to further improve data quality metrics of future input data. In turn, the system may improve the performance of the machine learning module as it executes its assigned processes. The process may then loop back to block 401. In this way, the system increases the efficacy and efficiency of both the learning process and decisioning power of the machine learning module.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for machine learning-based real-time electronic data quality checks, the system comprising:
- a memory device with computer-readable program code stored thereon;
- a communication device; and
- a processing device operatively coupled to the memory device and the communication device, wherein the processing device is configured to execute the computer-readable program code to:
  - continuously monitor and analyze, in real-time, an input data stream via a data quality learning module according to a set of data quality criteria, wherein the input data stream comprises one or more transaction requests, wherein the set of data quality criteria comprises historical data gathering of data quality patterns and associated static exception conditions, real-time data gathering of data patterns, and feeds from known adversarial attack types;
  - based on analyzing the input data stream, dynamically adjust a set of exception criteria;
  - transmit a data quality output from the data quality learning module to a machine learning module, wherein the data quality output comprises a data quality score generated based on the set of data quality criteria;
  - based on the data quality output, generate, via the machine learning module, a machine learning output, wherein the machine learning output comprises one or more recommended actions for processing the one or more transaction requests; and
  - transmit real-time feedback from the machine learning module to the data quality learning module, wherein the real-time feedback comprises at least one of a measure of data quality and one or more recommendations to the data quality learning module for processing the input data stream.

2. The system according to claim 1, wherein the set of data quality criteria comprises an analysis of an emerging threat pattern from the input data stream.

3. The system according to claim 1, wherein the set of data quality criteria comprises an analysis of a historical data pattern.

4. The system according to claim 1, wherein the set of data quality criteria comprises an analysis of an emerging loss and mis-prediction pattern based on a data quality issue.

5. The system according to claim 1, wherein the set of data quality criteria comprises rule-based guidelines for data quality.

6. The system according to claim 1, wherein the set of data quality criteria are stored in a look up table, a policy table, or a reference data repository.

7. The system according to claim 1, wherein the system further comprises a reinforcement learning engine, wherein the reinforcement learning engine provides positive or negative reinforcement according to the machine learning output.

8. The system according to claim 1, wherein the data quality output comprises instructions on processing the input data stream, wherein the instructions comprise a real-time recommendation on processing the input data stream.

9. The system according to claim 8, wherein the instructions on processing the input data stream comprise a remediation or correction of the input data stream.

10. The system according to claim 1, wherein the computer-readable program code further causes the processing device to generate, in real-time, a metric on data quality.

11. The system according to claim 1, wherein the computer-readable program code further causes the processing device to rectify, in real-time, data quality issues in the input data stream using historical data patterns and data quality patterns.

12. The system according to claim 11, wherein rectifying data quality issues in the input data stream comprises filling in missing transaction data for the transaction request.

13. The system according to claim 11, wherein rectifying data quality issues in the input data stream comprises rectifying data patterns using fuzzy matching or formatting corrections.

14. The system according to claim 11, wherein rectifying data quality issues in the input data stream comprises adjusting the set of exception criteria to minimize negative reinforcement of the machine learning output.

15. A standalone data quality learning module for machine learning-based real-time electronic data quality checks, the module comprising:
- a memory device with computer-readable program code stored thereon;
- a neural network device;
- a communication device; and
- a processing device operatively coupled to the memory device and the communication device, wherein the processing device is configured to execute the computer-readable program code to:
  - continuously monitor and analyze, in real-time, an input data stream via a data quality learning module according to a set of data quality criteria, wherein the input data stream comprises one or more transaction requests, wherein the set of data quality criteria comprises historical data gathering of data quality patterns and associated static exception conditions, real-time data gathering of data patterns, and feeds from known adversarial attack types;
  - based on analyzing the input data stream, dynamically adjust a set of exception criteria;
  - transmit a data quality output from the data quality learning module to a machine learning module, wherein the data quality output comprises a data quality score generated based on the set of data quality criteria;
  - based on the data quality output, generate, via the machine learning module, a machine learning output, wherein the machine learning output comprises one or more recommended actions for processing the one or more transaction requests; and
  - transmitting real-time feedback from the machine learning module to the data quality learning module, wherein the real-time feedback comprises at least one of a measure of data quality and one or more recommendations to the data quality learning module for processing the input data stream.

16. The module according to claim 15, wherein the set of data quality criteria comprises an analysis of an emerging threat pattern from the input data stream.

17. The module according to claim 15, wherein the set of data quality criteria comprises an analysis of a historical data pattern.

18. A computer-implemented method for machine learning-based real-time electronic data quality checks, the method comprising:
- continuously monitoring and analyzing, in real-time, an input data stream via a data quality learning module according to a set of data quality criteria, wherein the input data stream comprises one or more transaction requests, wherein the set of data quality criteria comprises historical data gathering of data quality patterns and associated static exception conditions, real-time data gathering of data patterns, and feeds from known adversarial attack types;

based on analyzing the input data stream, dynamically adjusting a set of exception criteria;

transmitting a data quality output from the data quality learning module to a machine learning module, wherein the data quality output comprises a data quality score generated based on the set of data quality criteria;

based on the data quality output, generating, via the machine learning module, a machine learning output, wherein the machine learning output comprises one or more recommended actions for processing the one or more transaction requests; and transmitting real-time feedback from the machine learning module to the data quality learning module, wherein the real-time feedback comprises at least one of a measure of data quality and one or more recommendations to the data quality learning module for processing the input data stream.

19. The method according to claim 18, wherein the set of data quality criteria comprises an analysis of an emerging threat pattern from the input data stream.

20. The method according to claim 18, wherein the set of data quality criteria comprises an analysis of a historical data pattern.

\* \* \* \* \*